(12) United States Patent
Maro

(10) Patent No.: US 11,421,807 B2
(45) Date of Patent: Aug. 23, 2022

(54) UNIVERSAL THREADLESS CONNECTION

(71) Applicant: DEERE & COMPANY, Moline, IL (US)

(72) Inventor: Randall A. Maro, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 354 days.

(21) Appl. No.: 16/288,479

(22) Filed: Feb. 28, 2019

(65) Prior Publication Data

US 2020/0025320 A1    Jan. 23, 2020

Related U.S. Application Data

(60) Provisional application No. 62/701,881, filed on Jul. 23, 2018.

(51) Int. Cl.
*F16L 37/084* (2006.01)
*F16L 37/088* (2006.01)

(52) U.S. Cl.
CPC ........... *F16L 37/084* (2013.01); *F16L 37/088* (2013.01)

(58) Field of Classification Search
CPC .............................. F16L 37/084; F16L 37/088
USPC ........................................................ 285/321
See application file for complete search history.

(56) References Cited

U.S. PATENT DOCUMENTS

| | | |
|---|---|---|
| 3,534,988 A | 10/1970 | Lindsey |
| 3,540,760 A | 11/1970 | Miller et al. |
| 3,948,548 A * | 4/1976 | Voss ..................... F16L 37/0885 285/321 |
| 4,191,408 A | 3/1980 | Acker |
| 4,278,276 A | 7/1981 | Ekman |

(Continued)

FOREIGN PATENT DOCUMENTS

| | | |
|---|---|---|
| CN | 101617160 A | 12/2009 |
| CN | 103998844 A | 8/2014 |

(Continued)

OTHER PUBLICATIONS

German Search Report issued in German Patent Application No. 102019208931.3 dated May 5, 2020, in 8 pages.

(Continued)

*Primary Examiner* — Zachary T Dragicevich
(74) *Attorney, Agent, or Firm* — Taft Stettinius & Hollister LLP; Stephen F. Rost

(57) ABSTRACT

A female fluid adapter assembly that has a receiving end that receives a fluid device, a female quick connect end coupled to the receiving end, and a through hole defined between the receiving end and the female quick connect end to allow fluid to flow therebetween. Wherein, the female quick connect end has a first cylindrical opening having a first diameter, a second cylindrical opening having a second diameter, the second diameter being smaller than the first diameter, a female transition profile defined between the first cylindrical opening and the second cylindrical opening, the female transition profile providing a transition from the first diameter of the first cylindrical opening to the second diameter of the second cylindrical opening. Wherein, the female quick connect end is coupleable to a male quick connect end having a male transition profile, the female transition profile being different from the male transition profile.

17 Claims, 12 Drawing Sheets

(56) References Cited

U.S. PATENT DOCUMENTS

| | | |
|---|---|---|
| 4,565,392 A | 1/1986 | Vyse |
| 4,906,031 A | 3/1990 | Vyse |
| 5,570,910 A | 11/1996 | Highlen |
| 5,749,606 A * | 5/1998 | Lu ................... F16L 37/0885 |
| | | 285/321 |
| 6,095,570 A | 8/2000 | Hagen et al. |
| 6,474,698 B2 | 11/2002 | Dobler et al. |
| 6,604,760 B2 | 8/2003 | Cresswell et al. |
| 6,637,781 B1 | 10/2003 | Seymour, II |
| 6,869,108 B2 | 3/2005 | Kwon et al. |
| 7,014,215 B2 | 3/2006 | Cooper et al. |
| 7,364,207 B2 | 4/2008 | McGee et al. |
| 7,631,905 B2 | 12/2009 | McGee et al. |
| 8,746,750 B2 | 6/2014 | Gilbreath |
| 8,746,751 B2 | 6/2014 | Gilbreath et al. |
| 9,039,045 B2 | 5/2015 | Cooper et al. |
| 2003/0001386 A1 | 1/2003 | Cresswell et al. |
| 2004/0090066 A1 * | 5/2004 | Hoffmann ............ F16L 37/088 |
| 2006/0061097 A1 * | 3/2006 | Swift ................. F16L 37/0887 |
| | | 285/321 |

FOREIGN PATENT DOCUMENTS

| | | |
|---|---|---|
| DE | 20204631 | 8/2002 |
| EP | 1770320 A1 | 4/2007 |
| GB | 2288214 | 10/1995 |

OTHER PUBLICATIONS

Dixon Quick Coupling; 2013 Catalog; www.dixonquickcoupling.com; pp. 1-172; Published in the USA; vol.-Issue No. DQC413-1P20M.

Chinese Office Action issued in application No. 201910548450.7 dated Apr. 21, 2022 (13 pages).

* cited by examiner

UNIVERSAL THREADLESS CONNECTION

CROSS-REFERENCE TO RELATED APPLICATIONS

This application claims the benefits of U.S. Provisional Application No. 62/701,881 filed Jul. 23, 2018, the contents of which are hereby incorporated herein in their entirety.

FIELD OF THE DISCLOSURE

The present disclosure relates to a quick connect adapter, and, in particular, to a quick connect adapter that provides a universal coupling interface.

BACKGROUND

Fluid couplers are common in many different industries to facilitate providing a fluid channel between a source and an end user. The fluid passed through the fluid channel is frequently air in pneumatic systems or hydraulic oil in hydraulic systems. Often the source provides the fluid through the fluid channel to the end user at a flow and pressure that is sufficient for the end user to implement a desired function. In a pneumatic braking system, for example, the source is often a compressor or compressed air reservoir and the end user is often a braking assembly. Similarly, in a hydraulic system of a work machine the source is often a hydraulic pump and the end user is often a hydraulic implement.

A basic fluid coupler has a male end that is coupled to a hose or other fitting and a female end that is coupled to a hose or other fitting. The two ends have a through hole defined therethrough to allow fluid to transfer from the male hose or fitting to the female hose or fitting. The male portion of the basic fluid coupler often has a threaded section that extends from a hex-shaped base. The female portion of the basic fluid coupler often has a complimentary threaded recessed section within a hex-shaped base. To fluidly couple the basic fluid coupler, the threaded male end is aligned with the threaded female end and the two ends are rotated relative to one another until they are fluidly coupled together. Often, tools are required to properly couple the hex-shaped portions of the basic fluid coupler.

The basic fluid coupler requires substantial user time to properly install. Accordingly, the basic fluid coupler is not ideal for situations that require fast coupling of a fluid connector. However, quick connect couplers have been developed to facilitate fluidly coupling hoses to one another more quickly compared to the basic fluid coupler. The quick connect couplers often have a female quick connect end with a female profile portion that corresponds to a male quick connect end that has a male profile portion. The male profile and the female profile are often substantially identical to one another to allow the male quick connect end to become positioned within the female quick connect end. Further, one of the male or female quick connect ends may have a lock ring or other locking feature that holds the male end inside the female end once properly seated therein. The profile portions of the male and female ends are often specifically formed by a manufacturer so the male and female ends will not easily work with male and female ends produced by other manufacturers.

Quick connect couplers provide a relatively easy coupling process that allows for comparatively fast coupling of hoses from a fluid system. Among other things, quick connect couplers can provide a way to quickly fluidly couple components during a manufacturing process or the like. For example, a manufacturing process for a work machine often includes several sub-assemblies, each sub-assembly being constructed separately from the other. After each of the sub-assemblies are constructed, they may be brought together and coupled to the work machine at large. At this phase in the manufacturing process, several fluid connections may be required to couple the sub-assemblies to the work machine. In this example, the quick connect couplers are often implemented on the connections between the sub-assemblies and the work machine at large to reduce the time it takes to manufacture the work machine.

While quick connect couplers may aid in the manufacturing process, the current male quick connect couplers typically only couple with one type of female connector and vice versa. Accordingly, utilizing current quick connect couplers requires identifying the type of male or female quick connect coupler being used and ensuring that the other of the male or female quick connect coupler is the proper type for fluid coupling.

Accordingly, there is a need for a quick connect system that accommodates different types of quick connect couplers interchangeably.

SUMMARY

One embodiment is a female fluid adapter assembly that is coupleable to both a first male connector and a second male connector that has a receiving end that receives a fluid device, a female quick connect end coupled to the receiving end, a through hole defined between the receiving end and the female quick connect end to allow fluid to flow therebetween. Wherein, the female quick connect end comprises has a first cylindrical opening having a first diameter, a second cylindrical opening having a second diameter, the second diameter being smaller than the first diameter, a female transition section between the first cylindrical opening and the second cylindrical opening that provides a transition from the first diameter of the first cylindrical opening to the second diameter of the second cylindrical opening. Wherein, the female transition section is configured to independently accommodate both a first male transition section and a second male transition section to fluidly couple the female quick connect end to either one of a first male end having the first male transition section and a second male end having the second male transition section. Wherein the first male end has a first cylindrical portion, an intermediate cylindrical portion, and a second cylindrical portion. Wherein the first male transition section is between the first cylindrical portion and the second cylindrical portion, the intermediate cylindrical portion being positioned in the first male transition section. Wherein the second male end has a first cylindrical portion and a second cylindrical portion. Wherein the second male transition section is between the first cylindrical portion and the second cylindrical portion and is not the same as the first male transition section.

In one example of this embodiment, the female transition section has a profile that is different from both a profile of the first male transition section and a profile of the second male transition section. In another example, the female transition section has a frustum-shaped profile defined about a longitudinal axis. In some aspects of this example the first male connector has a first frustum-shaped section defined between the first cylindrical portion and the intermediate cylindrical portion at a first frustum angle relative to the longitudinal axis and a second frustum-shaped section defined between the intermediate cylindrical portion and the second cylindrical portion at a second frustum angle relative to the longitudinal axis and the frustum-shaped profile of the female transition section has a female frustum angle of about the same as the second frustum angle. In other aspects of this example, the second frustum angle is different from the first frustum angle. In yet other aspects of this example, inner walls of a cross-section of the female transition section are substantially parallel to outer walls of the second frustum-shaped section of the first male connector. Another aspect includes walls of the female transition section that are not parallel to walls of the first frustum-shaped section of the first male connector.

In yet another example, the second male connector has a single frustum-shaped section defined between the first cylindrical portion and the second cylindrical portion at a single frustum angle relative to the longitudinal axis and the frustum-shaped section of the female transition section has a female frustum angle that is less than the single frustum angle of the second male connector. In some aspects of this example, the single frustum-shaped section of the second male connector extends axially along the longitudinal axis between a male starting point and a male ending point and the frustum-shaped profile of the female transition extends axially along the longitudinal axis between a female starting point and a female ending point. Wherein none of the male starting point, male ending point, female starting point, or female ending point are axially aligned along the longitudinal axis when the second male connector is coupled to the female quick connect end. In some aspects of this example, the male starting point is spaced axially away from the female starting point along the longitudinal axis by a gap.

Another embodiment is a female fluid adapter assembly that has a receiving end that receives a fluid device, a female quick connect end coupled to the receiving end, and a through hole defined between the receiving end and the female quick connect end to allow fluid to flow therebetween. Wherein, the female quick connect end has a first cylindrical opening having a first diameter, a second cylindrical opening having a second diameter, the second diameter being smaller than the first diameter, a female transition profile defined between the first cylindrical opening and the second cylindrical opening, the female transition profile providing a transition from the first diameter of the first cylindrical opening to the second diameter of the second cylindrical opening. Wherein, the female quick connect end is coupleable to a male quick connect end having a male transition profile, the female transition profile being different from the male transition profile.

In one example of this embodiment, the female transition profile is frustum-shaped. In some aspects of this example, the female transition profile is angled relative to a longitudinal axis at a female profile angle, the female profile angle being about the same as a leading male profile angle of the male transition profile. In another aspect of this example, the female transition profile is angled relative to a longitudinal axis at a female profile angle, the female profile angle being less than a male profile angle of the male transition profile.

In yet another example, the female transition profile is sized to at least partially receive a first male end having a first male transition profile or a second male end having a second male transition profile, the first male transition profile being different than the second male transition profile. Another aspect of this example has a cylindrical opening defined in the female quick connect end adjacent to the through hole. Wherein the female transition profile is sized to receive either a first male end having a first male transition profile or a second male end having a second male transition profile. Wherein, the female quick connect end fluidly couples the corresponding first or second male end to the through hole at the cylindrical opening.

Another embodiment of this disclosure is a method of manufacturing a machine having at least one fluid connection by providing a female fluid adapter assembly having a female quick connect end with a first cylindrical opening having a first diameter, a locking member defined in a portion of the first cylindrical opening, a second cylindrical opening having a second diameter, the second diameter being smaller than the first diameter, a female transition section between the first cylindrical opening and the second cylindrical opening, the female transition section having a female transition profile between the first diameter of the first cylindrical opening to the second diameter of the second cylindrical opening. Providing at least one of at least one first male connector and at least one second male connector. Wherein the at least one first male connector has a first male quick connect end that has a first cylindrical portion, an intermediate cylindrical portion, a second cylindrical portion, and a first male transition section between the first cylindrical portion and the second cylindrical portion, the intermediate cylindrical portion being positioned in the first male transition section. Wherein the at least one second male connector has a second male quick connect end with a first cylindrical portion, a second cylindrical portion, and a second male transition section between the first cylindrical portion and the second cylindrical portion and is not the same as the first male transition section. The method including selecting one of the at least one first male connector and the at least one second male connector and fluidly coupling the selected male quick connect end to the female quick connect end by inserting the selected male quick connect end into the female quick connect end until the locking member engages the selected male quick connect end.

In one example of this embodiment, the female transition section has a profile that is different from both a profile of the first male transition section and a profile of the second male transition section. Another example includes removing the selected male quick connect end from the female quick connect end and inserting the other of the first male quick connect end and the second male quick connect end into the female quick connect end. Some aspects of this example include providing a plurality of female fluid adapters and coupling at least one of the plurality of female fluid adapters to the at least one first male connector of the at least one first male connector and at least one of the plurality of female fluid adapters to the at least one second male connector of the at least one second male connector.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 5b is a sectional elevated perspective view of the second female connector from FIG. 5a;

Corresponding reference numerals are used to indicate corresponding parts throughout the several views.

DETAILED DESCRIPTION

Figure 1:
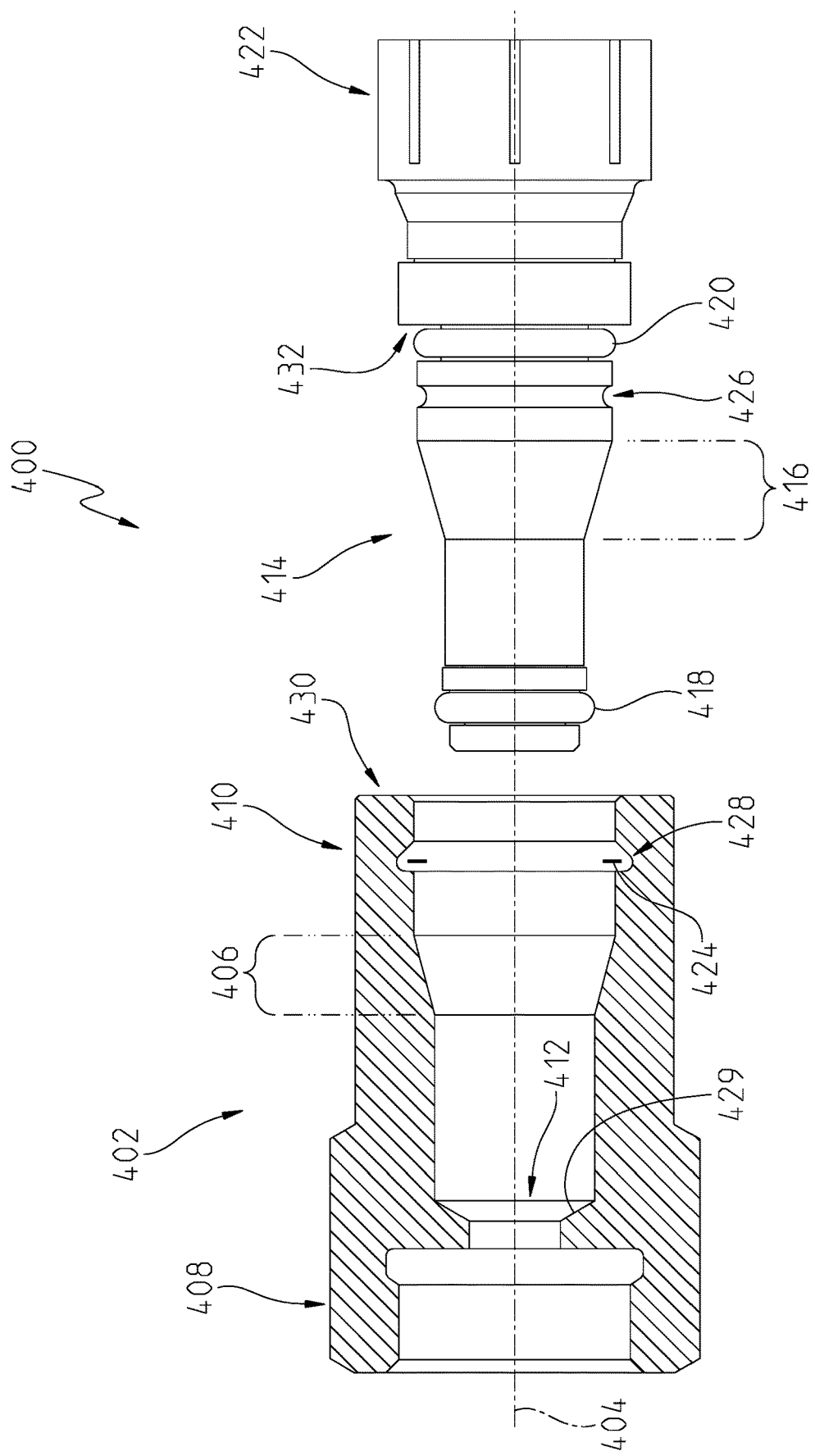
FIG. 1 is a sectional side view of a second female connector spaced from a second male connector.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

Figure 4:
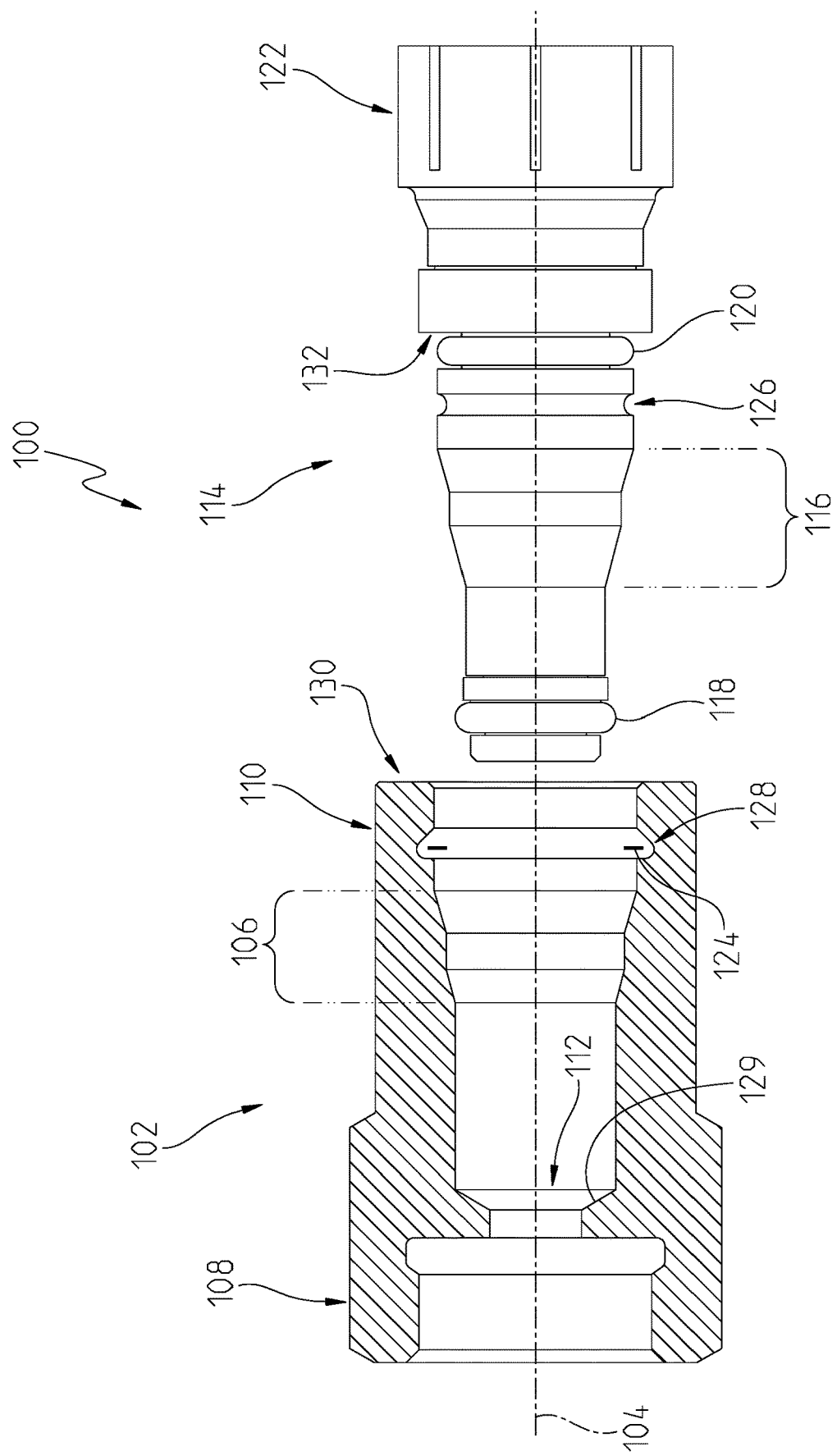
FIG. 4 is a sectional side view of the first female connector of FIG. 2 spaced from the first male connector of FIG. 3.

In FIG. 4, an embodiment of first connector 100 is illustrated. The first connector 100 of FIG. 4 illustrates a first female end 102 in a sectional view along a longitudinal axis 104 to more clearly illustrate a first female profile or transition portion 106. The first female end 102 may have a hose receiving end 108, e.g., a first end, on one side and a first female quick connect end 110 on the other end, e.g., a second end. The hose receiving end 108 may have a threaded inner surface that is sized to receive a threaded hose from a hydraulic, pneumatic, or the like system.

While a threaded hose coupling is described herein, any type of hose coupling mechanism is considered. More specifically, the hose receiving end 108 may be configured to be crimped or otherwise clamped or compressed around a hose. Regardless of the coupling method, the hose receiving end 108 provides a location to fluidly couple the hose to the first connector 100. Further, the hose connecting end 108 may not be coupled to a hose at all, but rather the hose connecting end 108 may be coupled to a fluid manifold, valve, or any other mechanism that may be utilized in a fluid system.

A through hole 112 may fluidly couple the hose receiving end 108 to the first female quick connect end 110 along the longitudinal axis 104. Accordingly, when a hose is fluidly coupled to the hose receiving end 108, fluid may flow through the hose, the hose receiving end 108, and the through hole 112 and into the first female quick connect end 110.

The first female quick connect end 110 may be sized to at least partially receive a first male end 114. The first male end 114 may have a first male transition profile or portion 116 that corresponds to the first female transition profile 106. For example, the first male end 114 may be a negative of the first female transition profile 106, and vice versa. More specifically, the first male transition profile 116 may be substantially axially aligned with the first female transition profile 106 along the longitudinal axis 104 when fluidly coupled thereto. In some non-exclusive examples, the first male transition profile 116 may have substantially the same radial contours as the first female transition profile 106, but have a slightly smaller radius throughout. For example, the radial contours of the first male transition profile 116 may be smaller than the radial contours of the first female transition profile 106 by less than about 5%, less than about 4%, less than about 3%, less than about 2%, less than about 1%, or less than about 0.5%. Accordingly, when the first male end 114 is positioned within the first female quick connect end 110, the first male transition profile 116 is positioned proximate to, albeit radially inside of, the first female transition profile 106.

The first male end 114 may also have a seal assembly 118 positioned on one end thereof, e.g., the distal end thereof. The seal assembly 118 may be sized to provide a fluid seal between the first male end 114 and the first female end 102. More specifically, when the first male end 114 is coupled to the first female end 102 the seal assembly 118 may ensure that fluid passes between the first female end 102 and the first male end 114 along the longitudinal axis 104 and not around an outer surface of the first male end 114, e.g., between the outer surface of the first male end 114 and the inner surface of the first female end 102. In some non-exclusive examples, the seal assembly 118 may be an O-ring type seal. Further, a spacer, e.g., a synthetic spacer, may be positioned adjacent to the O-ring seal to prevent the O-ring from pinching between the first male end 114 and the first female end 102 when the first male end 114 is positioned therein.

Further, a debris seal 120 may be axially spaced from the seal assembly 118 along the axis 104 and positioned at a portion of the first male end 114. The portion of the first male end that receives the debris seal 120 may be axially spaced from the proximal end of the first male end 114, e.g., the hose receiving end 122. The debris seal 120 may be an O-ring type seal or the like and sized to fluidly seal the first male end 114 to the first female end 102. The debris seal 120 may substantially fluidly seal a portion of the first male end 114 from the surrounding environment when the first male end 114 is coupled to the first female end 102. In other words, the debris seal 120 may prevent debris from becoming positioned along the first male transition profile 116 by sealing an outer surface of the first male end 114 to an inner surface of the first female end 102 when coupled thereto.

In some aspects of this disclosure, the first female end 102 may have a lock ring 124 positioned in a female lock ring groove 128. The lock ring 124 may be positioned about the longitudinal axis 104 on or within the first female quick connect end 110. The lock ring 124 may correspond to a male lock ring groove 126 defined in or on, e.g., within an outer surface of, the first male end 114. As the first male end 114 is moved into engagement with the first female end 102, the lock ring 124 may be forced to expand radially as the lock ring 124 moves along an outer surface of the first male transition profile 116. Once the lock ring 124 reaches the male lock ring groove 126, it may elastically deform, e.g., radially inwardly, at least partially into the male lock ring groove 126. In other words, the lock ring 124 may remain in the female lock ring groove 128 as the first female end 102 engages the first male end 114. The locking ring 124 may expand as the locking ring 124 contacts the outer surface of the first male end 114 along the first male transition profile 116 until the lock ring 124 resides at least partially in the male lock ring groove 126. The lock ring 124 may then be positioned at least partially in the female lock ring groove 128 and the male lock ring groove 126 thereby locking the first male end 114 and first female end 102 together.

The lock ring 124 may have a thickness great enough to ensure that at least a portion of the lock ring 124 remains in both the female lock ring groove 128 and the male lock ring groove 126 when the first female end 102 is coupled to the first male end 114. Accordingly, once the lock ring 124 is positioned within the male lock ring groove 126, it may extend radially away from the male lock ring groove 126 a sufficient distance to contact the female lock ring groove 128. Once the lock ring 124 becomes positioned within the male lock ring groove 126, as described herein, the lock ring 124 may be positioned at least partially in both the female lock ring groove 128 and the male lock ring groove 126 to thereby prevent substantial axial movement of the first male end 114 relative to the first female end 102.

The first male end 114 may also have a hose receiving end 122 similar to the hose receiving end 108 of the first female end 102. Accordingly, a hose, or the like, may be coupled to the hose receiving end 122 to fluidly couple the hose from the first female end 102 to the hose of the first male end 114 when the two ends 102, 114 are fluidly coupled to one another.

Accordingly, in use, a hose or other fluid device may be fluidly coupled to the hose receiving end 108 of the first female end 102 and a hose may be fluidly coupled to the hose receiving end 122 of the first male end 114. Next, the first male end 114 may be axially aligned, e.g., generally aligned, with the first female end 102 along the longitudinal axis 104 and distal end of the first male end 114, e.g., incorporating the seal assembly 118, may be moved axially along the longitudinal axis 104 into the first female quick connect end 110. First male end 114 may be moved axially along the longitudinal axis 104 towards a back wall 129 of the first female end 102. As the seal assembly 118 passes the first female transition profile 106, the seal assembly 118 may become compressed between the first female end 102 and the first male end 114 to form a fluid seal therebetween.

As the first male transition profile 116 becomes aligned with the first female transition profile 106, the lock ring 124 may radially expand as the lock ring 124 is maintained in the female lock ring groove 128 while the first male end 114 is moved axially towards the back wall 129 of the first female end 102. Once the lock ring 124 is axially aligned with the male lock ring groove 126, the lock ring 124 may become at least partially positioned therein. Further, a female face 130 may contact a male face 132 when the lock ring 124 is positioned within the male lock ring groove 126 to prevent further axial movement of the first female end 102 relative to the first male end 114, e.g., further axial movement of the first male end 114 into the cavity of the first female end 102.

Figure 2:
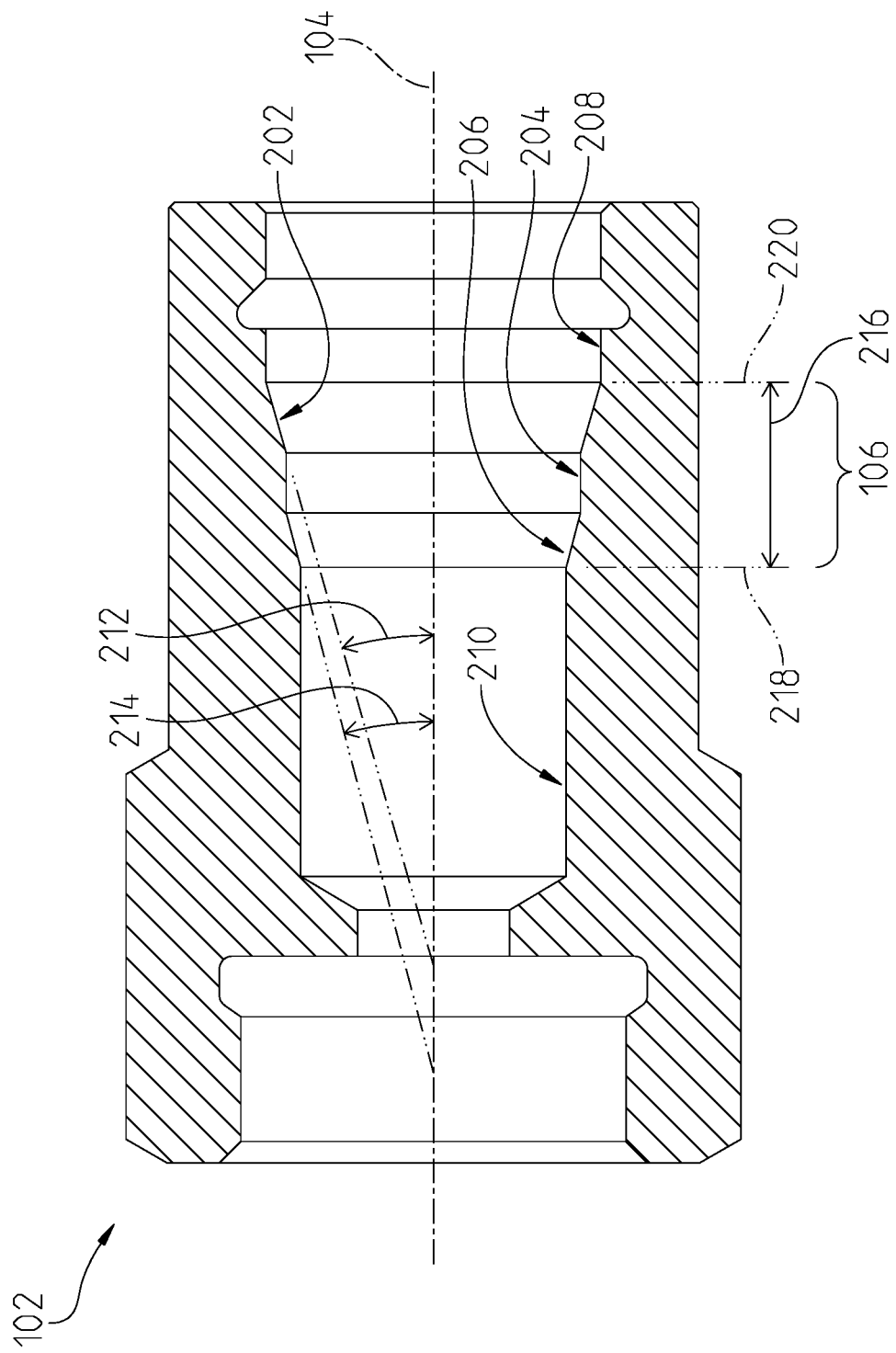
FIG. 2 is a sectional side view of a first female connector.

Referring now to FIG. 2, a sectional side view of the first female end 102 is illustrated. The first female transition profile 106 may be formed of a first female frustum-shaped section 202, a female intermediate cylindrical portion 204, and a second female frustum-shaped section 206. The first and second female frustum-shaped sections 202, 206 may be frustum-shaped, e.g., frusto-conical, cavities defined, e.g., formed, in the first female end 102 about the longitudinal axis 104. Similarly, the female intermediate cylindrical portion 204 may be a cylindrical cavity defined, e.g., formed, in the first female end 102 about the longitudinal axis 104.

The first female frustum-shaped section 202 may be a radial reduction as the first female end 102 transitions from a first female cylindrical portion or opening 208 to the female intermediate cylindrical portion 204. The first female cylindrical portion 208 has a radius greater than the female intermediate cylindrical portion 204. Similarly, the second female frustum-shaped section 206 may be a radial reduction as the second female frustum-shaped section 206 transitions from the female intermediate cylindrical portion 204 to a second female cylindrical opening or portion 210. The female intermediate cylindrical portion 204 has a radius greater than the second female cylindrical portion 210.

The first female frustum-shaped section 202 has a first female frustum angle 212 defined relative to the longitudinal axis 104. Similarly, the second female frustum-shaped section 206 has a second female frustum angle 214 defined relative to the longitudinal axis 104. In some non-exclusive examples, the first female frustum angle 212 may be greater than the second female frustum angle 214. However, other embodiments are also considered herein. In some embodiments, the first and second female frustum angles 212, 214 may be equal, e.g., the surfaces of the first female frustum-shaped section 202 and the second female frustum-shaped section 206 may be parallel to one another. In yet another embodiment, the first female frustum angle 212 may be less than the second female frustum angle 214. In some embodiments, the first female frustum angle 212 is less than about 60°, less than about 55°, less than about 50°, less than about 45°, less than about 40°, less than about 35°, less than about 30°, less than about 25°, less than about 20°, less than about 15°, less than about 10°, or any other angle that advantageously facilitates a mating connection of and between the first female end 102 and the first male end 114. In some embodiments, the second female frustum angle 214 is less than about 60°, less than about 55°, less than about 50°, less than about 45°, less than about 40°, less than about 35°, less than about 30°, less than about 25°, less than about 20°, less than about 15°, less than about 10°, or any other angle that advantageously facilitates a mating connection of and between the first female end 102 and the first male end 114.

In another aspect of this disclosure, the first female transition profile 106 may have a first female transition profile width 216 that extends an axial distance about or along the longitudinal axis 104. The first female transition profile width 216 may be the distance between a first female starting point 218 and a first female ending point 220 that define, e.g., longitudinally define, the first female transition profile 106.

Figure 3:
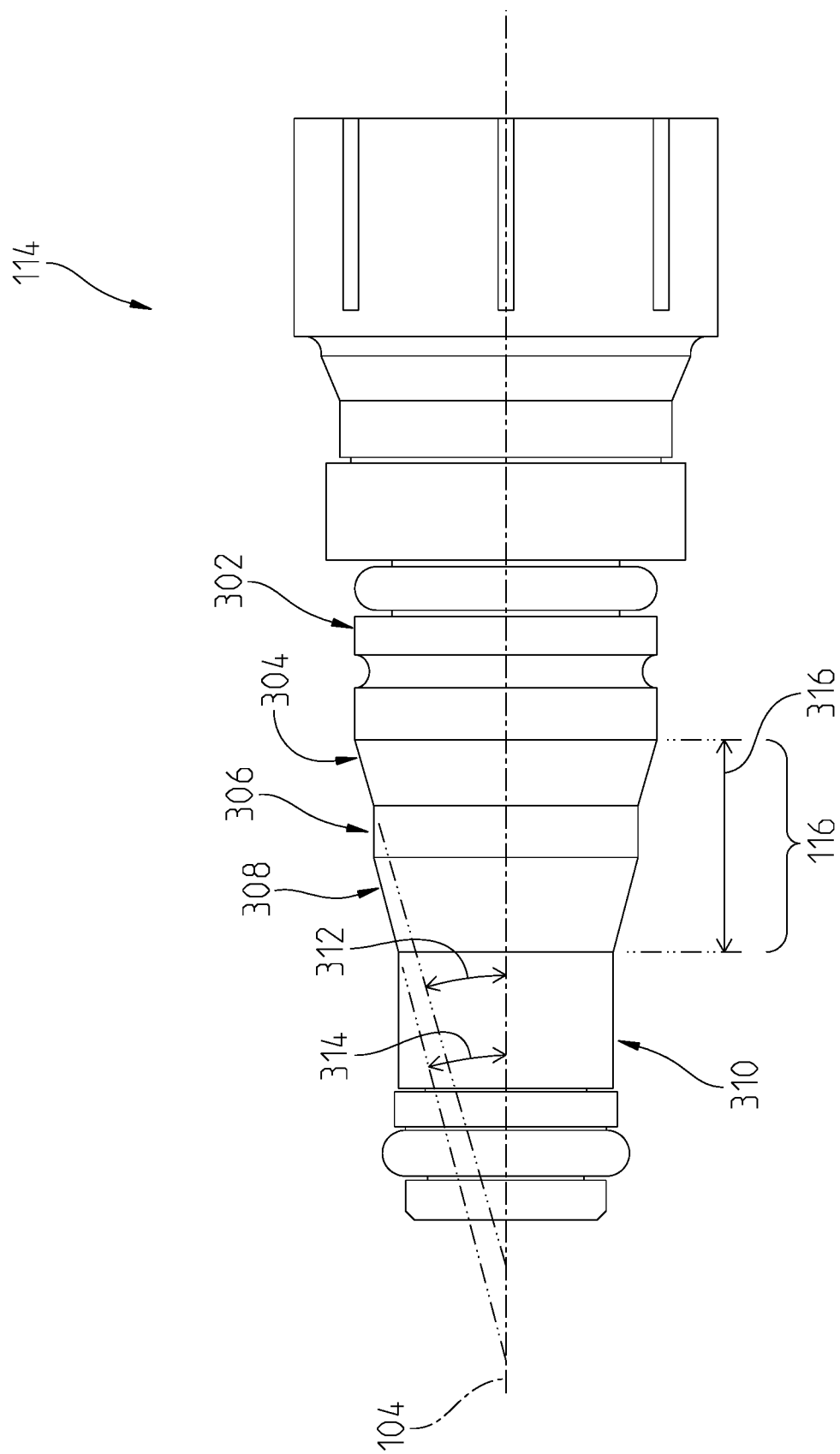
FIG. 3 is a side view of a first male connector.

Referring now to FIG. 3, the first male end 114 is illustrated in more detail. The first male end 114 may have a profile with features similar to the first female end 102. However, the features of the first male end 114 may be substantially inversely defined relative to the first female end 102. That is to say, the features of the first female end 102 illustrated in the section view of FIG. 2 are substantially cavities while the features described for the first male end 114 correspond to fit within the cavities of the first female end 102. The first male end 114 may have a through hole therethrough along the longitudinal axis 104 to allow fluid to flow to the hose or other device coupled to the receiving end 122.

Accordingly, the first male end 114 may have a first male cylindrical portion 302, a first male frustum-shaped section 304, a male intermediate section 306, a second male frustum-shaped section 308, and a second male cylindrical portion 310. Further, the first male frustum-shaped section 304 has a first male frustum angle 312 defined relative to the longitudinal axis 104 and the second male frustum-shaped section 308 has a second male frustum angle 314, or leading male profile angle, defined relative to the longitudinal axis 104. The first and second male frustum angles 312, 314 may be defined along walls of an outer surface of the corresponding first and second male frustum-shaped sections 304, 308.

The male cylindrical portions 302, 306, 310 of the first male end 114 may have diameters that are slightly smaller than the corresponding female cylindrical portions 208, 204, 210 of the first female end 102. Accordingly, the male cylindrical portions 302, 306, 310 of the first male end 114 may be substantially aligned with the corresponding first female cylindrical portions 208, 204, 210 of the first female end 102 when the first male end 114 is positioned within, e.g., matingly engaged with, the first female end 102. Similarly, the first male frustum angle 312 may be about the same as the first female frustum angle 212 and the second male frustum angle 314 may be about the same as the second female frustum angle 214. Accordingly, when the first male end 114 is positioned within, e.g., matingly engaged with, the first female end 102, the corresponding frustum-shaped sections 304, 202 and 308, 206 may have profile edges that are substantially parallel to one another. Further, the first male end 114 may have a first male transition profile width 316 that is about the same as the corresponding first female transition profile width 216.

Referring now to FIG. 1, a second connector 400 is illustrated having a second female end 402 in a sectional view along a longitudinal axis 404 to more clearly illustrate a second female transition section or profile 406. The second female end 402 may have a hose receiving end 408 on one side and a second female quick connect end 410 on the other. The hose receiving end 408 may have a threaded inner surface that is sized to receive a threaded hose or other device or the like from a hydraulic, pneumatic, or the like system, similar to the first connector 100. The hose receiving end 408 provides a location to fluidly couple the hose or the like to the second connector 400. Further, a through hole 412 may fluidly couple the hose receiving end 408 to the second female quick connect end 410 along the longitudinal axis 404. Accordingly, when a hose is fluidly coupled to the hose receiving end 408, fluid may flow through the hose, into the hose receiving end 408, through the through hole 412, and out of the second female quick connect end 410.

Figure 7:
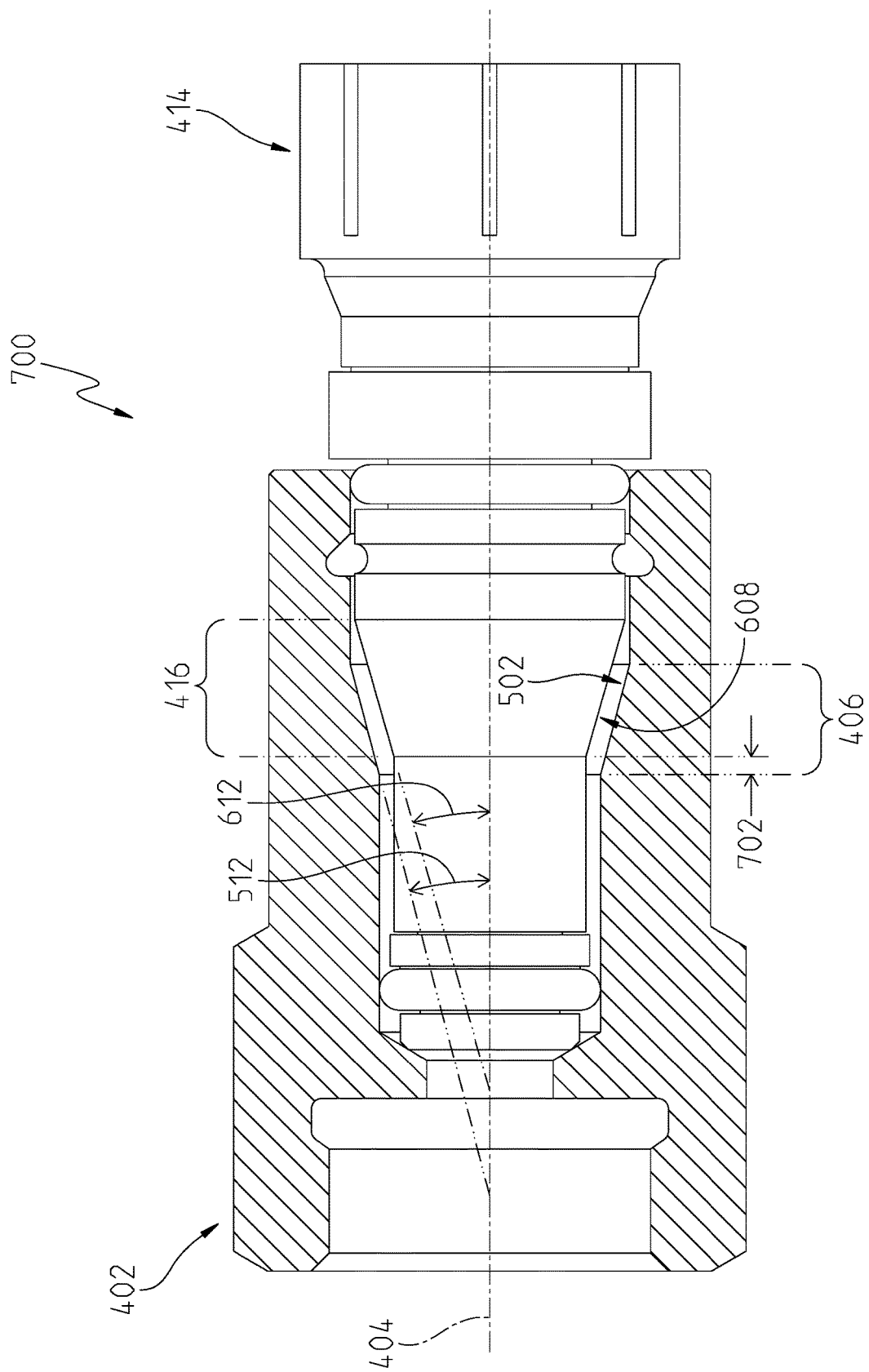
FIG. 7 is a sectional side view of the second female connector fluidly coupled to the second male connector.

The second female quick connect end 410 may be sized to at least partially receive a second male connector end 414. The second male connector end 414 may have a second male transition profile 416. In one non-exclusive example, the second male transition profile 416 may have a slightly different profile compared to the second female transition profile 406 and have at least a slightly smaller radius throughout when coupled thereto, as illustrated in FIG. 7.

The second male connector end 414 may have a seal assembly 418 positioned on one end, e.g., a distal end, thereof. The seal assembly 418 of the second connector 400 may function in substantially the same way as the seal assembly 118 of the first connector 100. Accordingly, the description of the seal assembly 118 above is hereby incorporated herein for the seal assembly 418 of the second connector 400.

Further, a debris seal 420 may be positioned along a portion of the second male end 414. The debris seal 420 may be an O-ring type seal, or the like, and sized to fluidly seal the second male end 414 to the second female end 402, when matingly engaged. The debris seal 420 may substantially fluidly seal the second connector 400 from the surrounding environment in similar way as described above for the debris seal 120 when the second female end 402 is coupled to the second male end 414.

In some aspects of this disclosure, the second female end 402 may have a lock ring 424 positioned in a female lock ring groove 428. The lock ring 424 may be positioned about the longitudinal axis 404 on or within the second female quick connect end 410. The lock ring 424 may correspond to a male lock ring groove 426 defined in or on the second male end 414.

The lock ring 424 and the lock ring grooves 428, 426 of the second connector 400 may function in substantially the same way as the lock ring 124 described above for the first connector 100. Accordingly, the above description of the lock ring 124 regarding the first connector 100 is hereby incorporated into this section regarding the second connector 400. In short, the lock ring 424 may axially lock the second male end 414 into the second female end 402 when the two ends 402, 414 are aligned and engaged.

The second male end 414 may also have a hose receiving end 422 similar to the hose receiving end 408. Accordingly, a hose or the like may be coupled to the hose receiving end 422 to fluidly couple the hose from the second female end 402 to the hose of the second male end 414 when the two ends 402, 414 are fluidly coupled to one another. More specifically, the second male end 414 may have a through hole defined along the longitudinal axis 404 that allows fluid to flow from the second female end 402 to the hose receiving end 422.

The function of the second connector 400 is generally the same as the function of the first connector 100. Similar to the first connector 100 described herein, the second connector 400 may allow a hose or the like to be fluidly coupled to the hose receiving end 408 of the second female end 402 and a hose or the like to be fluidly coupled to the hose receiving end 422 of the second male end 414. Next, the second male end 414 may be axially aligned, e.g., generally aligned, with the second female end 402 along the longitudinal axis 404 and the distal end of the second male end 414, e.g., incorporating seal assembly 418 may be moved axially along the longitudinal axis 404 into the second female quick connect end 410. Second male end 414 may be moved axially along the longitudinal axis 404 towards a back wall 429 of the second female end 402. As the seal assembly 418 passes the second female transition profile 406, the seal assembly 418 may become compressed between the second female end 402 and the second male end 414 to form a seal, e.g., a fluid-tight seal, therebetween.

As the second male transition profile 416 becomes axially aligned with the second female transition profile 406, the lock ring 424 may radially expand as the lock ring 424 is maintained in the female lock ring groove 428 while the second male connector 414 is moved axially towards the back wall 429. Once the lock ring 424 is axially aligned with the male lock ring groove 426, the lock ring 424 may become at least partially positioned therein. Further, a female face 430 may contact a male face 432 when the lock ring 424 is positioned within the male lock ring groove 426 to prevent further axial movement of the second female end 402 relative to the second male end 414, e.g., further axial movement of the second male end 414 into the cavity of the second female end 402.

Figure 5A:
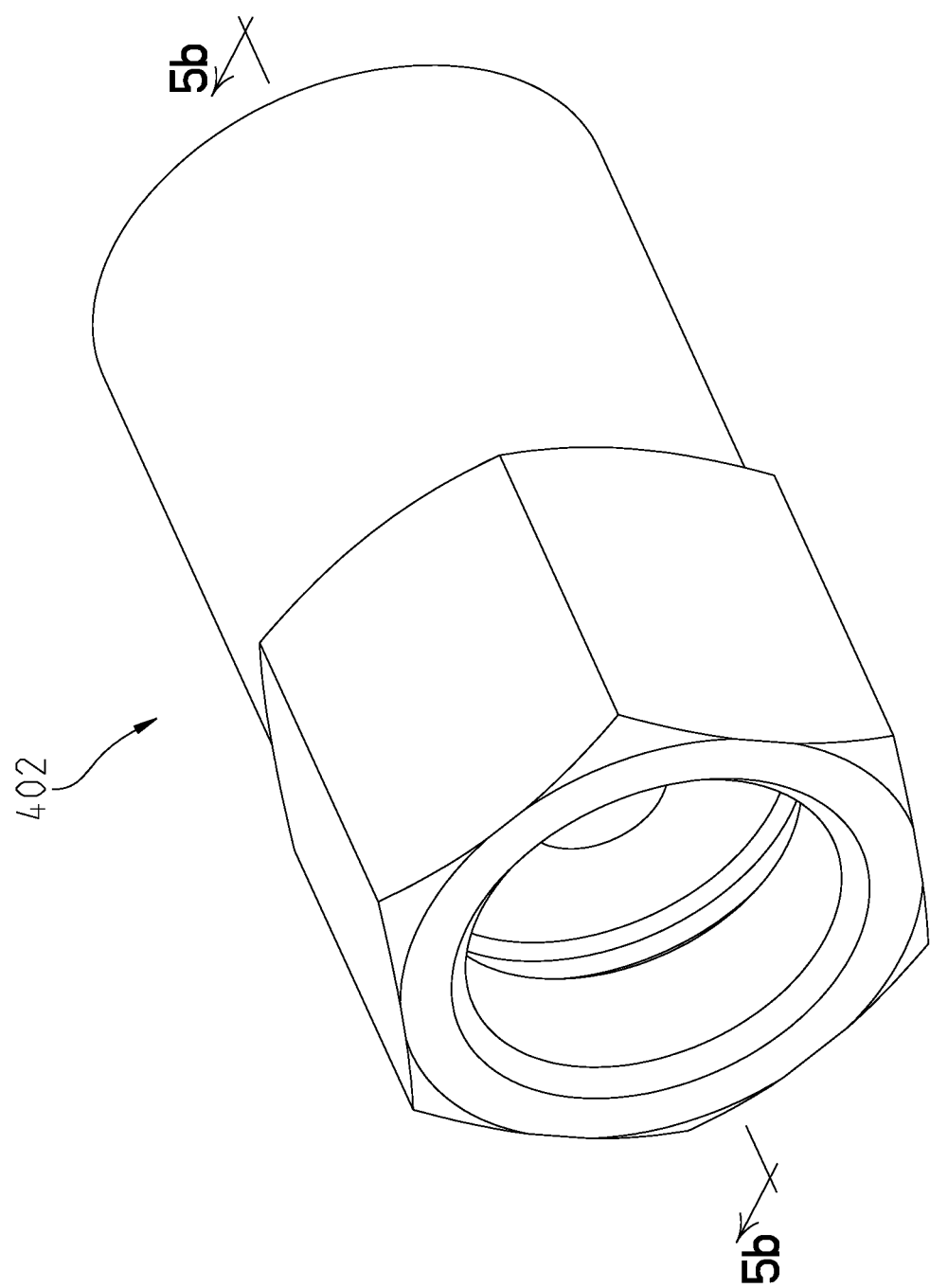
FIG. 5a is an elevated perspective view of the second female connector from FIG. 1.
Figure 5B:
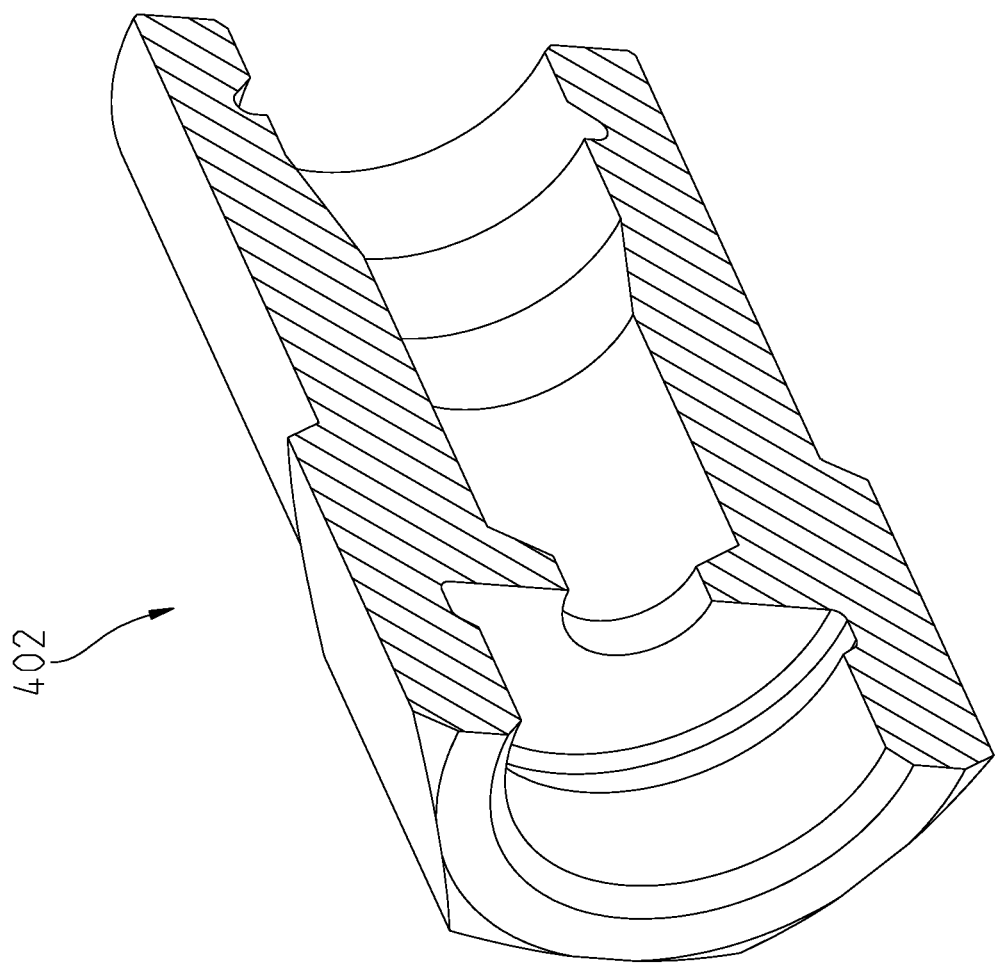
Figure 5C:
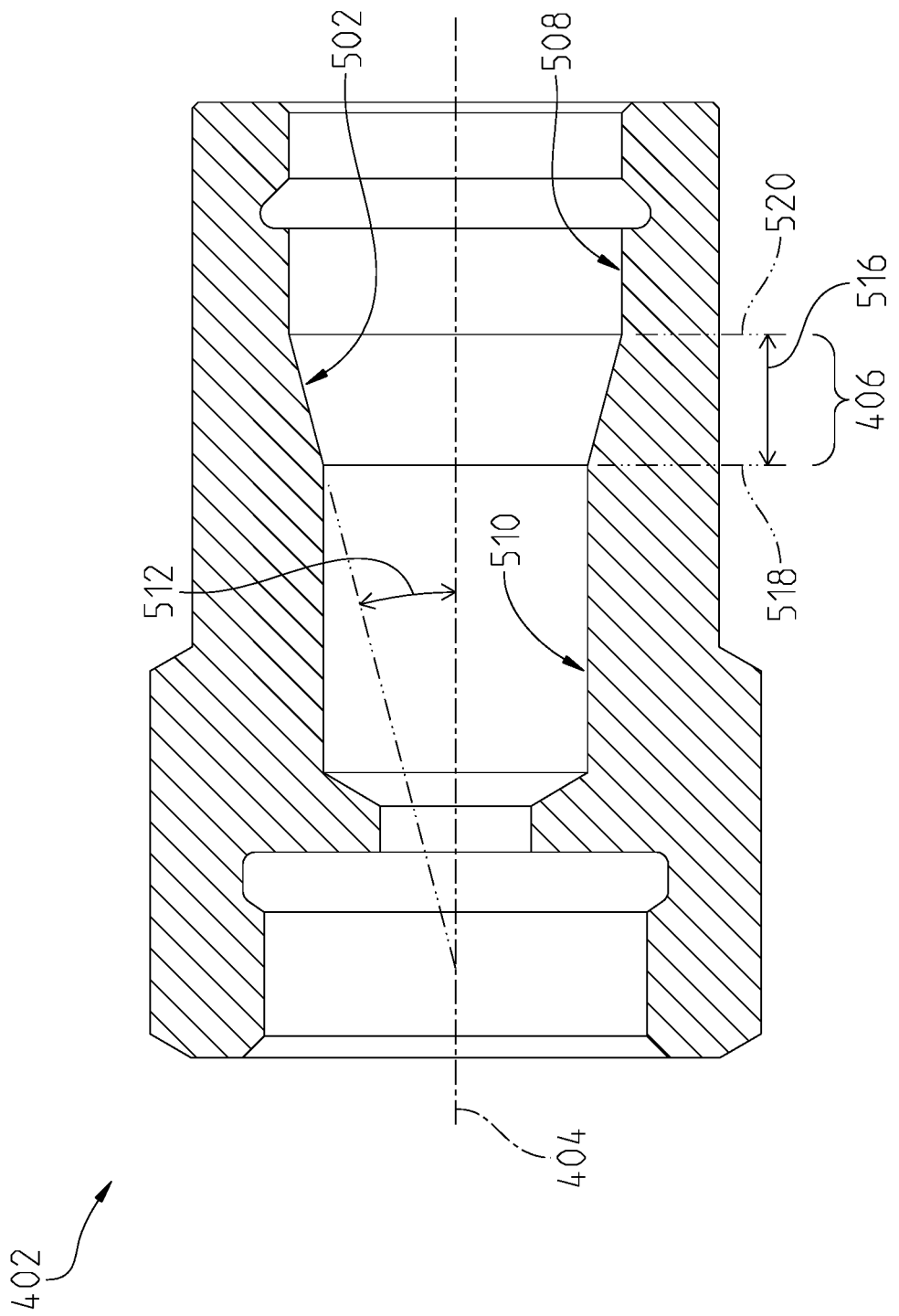
FIG. 5c is a sectional side view of the second female connector from FIG. 5b.

Referring now to FIG. 5a, an elevated perspective view of the second female end 402 is illustrated in complete form. In FIG. 5b, a sectional view of along the 5b plane is illustrated in an elevated perspective view. In FIG. 5c, a sectional view of the second female end 402 is illustrated in a side view to more clearly show the profile features therein. The second female transition profile 406 may be formed of a single frustum-shaped section 502. The single frustum-shaped section 502 may be a frustum-shaped cavity defined about the longitudinal axis 404.

The single frustum-shaped section 502 may be a radial reduction as the second female end 402 transitions from a first female cylindrical portion or opening 508 to a second female cylindrical opening or portion 510. The first female cylindrical opening 508 has a first diameter and the second female cylindrical opening 510 has a second diameter, the first diameter being larger than the second diameter. Further, the single frustum-shaped section 502 may have a second female single frustum angle 512, or female profile angle, defined relative to the longitudinal axis 404. The single female frustum angle 512 may be defined along an inner surface of the single frustum-shaped section 502 from the sider perspective illustrated in FIG. 5c. In some embodiments, the single female frustum angle 512 is less than about 60°, less than about 55°, less than about 50°, less than about 45°, less than about 40°, less than about 35°, less than about 30°, less than about 25°, less than about 20°, less than about 15°, less than about 10°, or any other angle that advantageously facilitates a mating connection of and between the second female end 402 and the second male end 414.

In another aspect of this disclosure, the second female transition profile 406 may have a second female transition profile width 516 that is an axial distance along the longitudinal axis 404. The second female transition profile width 516 may be the distance between a second female starting point 518 and a second female ending point 520 that define the second female transition profile 406.

Figure 6:
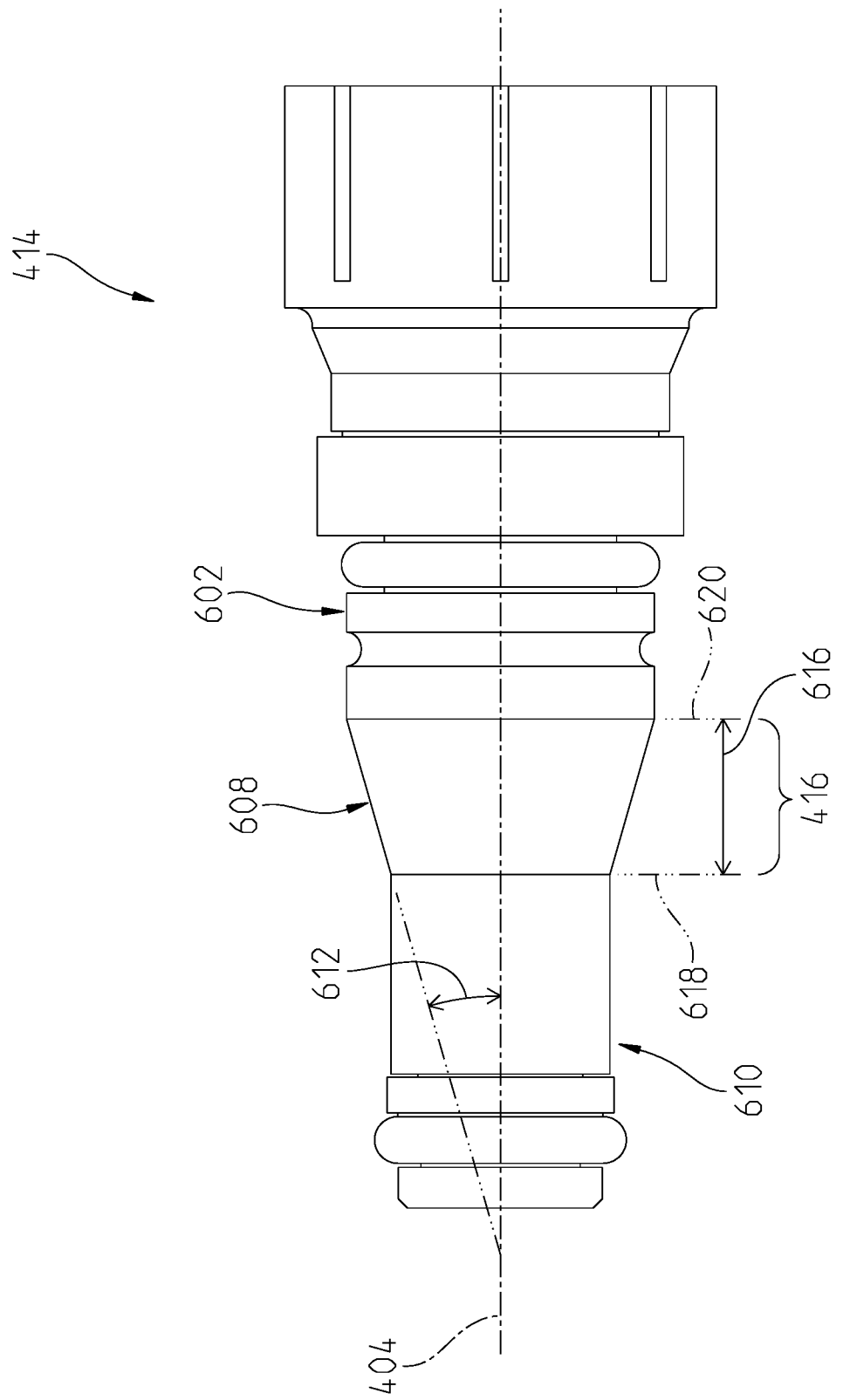
FIG. 6 is a side view of the second male connector from FIG. 1.

Referring now to FIG. 6, the second male end 414 is illustrated in more detail. The second male end 414 may have a second male large cylindrical portion 602, a second male single frustum-shaped section 608, and a second male small cylindrical portion 610. Further, the second male single frustum-shaped section 608 has a second male single frustum angle 612, or male profile angle, relative to the longitudinal axis 404. The second male single frustum angle 612 is defined along an outer surface or wall of the second male end 414 as illustrated in the side view of FIG. 6.

The second male cylindrical portions 602, 610 may have diameters that are slightly smaller than the corresponding second female cylindrical portions 508, 510. Accordingly, the second male cylindrical portions 602, 610 may be positioned within the corresponding second female cylindrical portions 508, 510 when the second male end 414 is positioned within the second female end 402, as illustrated in FIG. 7. However, the second male single frustum angle 612 may be slightly angularly offset from the second female single frustum angle 512. Accordingly, when the second male end 414 is positioned in the second female end 402, e.g., when the two components are matingly engaged, the corresponding frustum-shaped sections 608, 502 may have profile edges that are angularly offset relative to one another, e.g., the second male single frustum angle 612 may be different than the second female single frustum angle 512. Further, the second male end 414 may have a second male transition profile width 616 that is slightly smaller than the corresponding second female transition profile width 516. The second male transition profile width 616 may extend from a second male starting point 618 to a second male ending point 620 that define, e.g., longitudinally define, the second male transition section or profile 416.

Referring now to FIG. 7, a side view of the second male and female ends 414, 402 are shown in the fluidly coupled orientation 700. For the sake of illustration, the second female end 402 is shown as a sectional view to illustrate its inner contours, described herein. FIG. 7 illustrates the alignment of the second female transition profile 406 and the second male transition profile 416. Further, both the male and female single frustum angles 612, 512 are shown. More specifically, the second male single frustum angle 612 may be greater than the female single frustum angle 512. In this orientation, the profile of the second male single frustum-shaped section 608 is not parallel to the profile of the single frustum-shaped section 502 of the second female end 402—as shown, the profile of the second male single frustum-shaped section 608 is angularly offset from the single frustum-shaped section 502 of the second female end 402.

In some aspects of this disclosure, the ends 402, 414 of the second connector 400 are shaped to accommodate the opposing connector of either the first or second connector 100, 400. That is to say, the second female end 402 may be sized to allow either the first male end 114 or the second male end 414 to be fluidly coupled thereto. In some aspects of this disclosure, the second female cylindrical opening 510 may be sized to accommodate either the second male cylindrical portion 310 of the first male end 114 or the second male small cylindrical portion 610 of the second male end 414. Similarly, the first female cylindrical opening 508 may be sized to accommodate either the first male cylindrical portion 302 of the first male end 114 or the first male cylindrical portion 602 of the second male end 414. In other words, the first and second male ends 114, 414 may only substantially differ in shape along the transition profiles 116, 416. Further, the second male transition profile 416 may be axially offset from the second female transition profile 406 by a gap 702 (shown in FIG. 7). More specifically, the second male starting point 618 may be offset from the second female starting point 518 along the longitudinal axis 404 by the gap 702.

Figure 8:
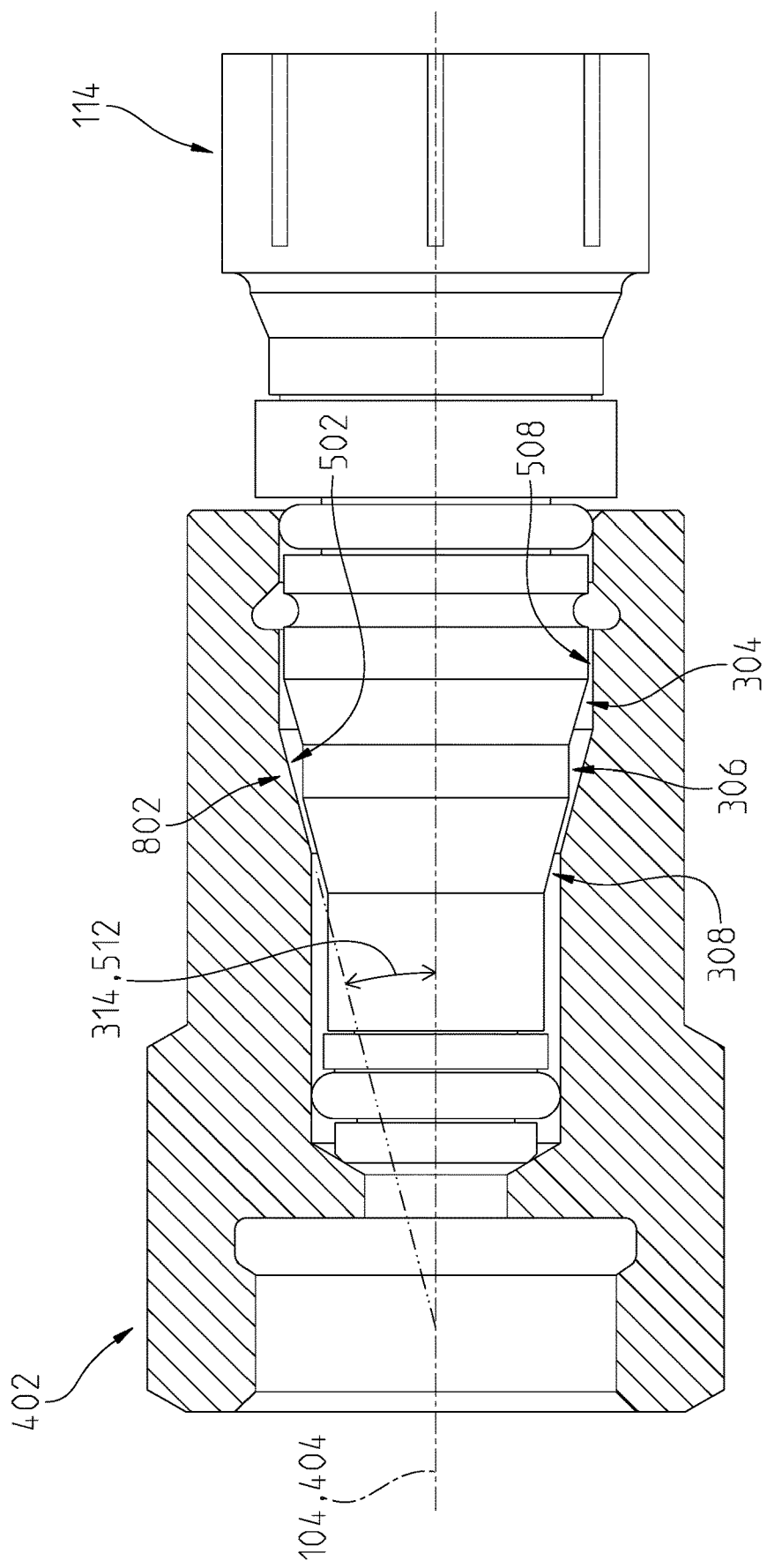
FIG. 8 is a sectional side view of the second female connector fluidly coupled to a first male connector.

The second female end 402 can accommodate the second male transition profile 416 as explained herein with reference to FIG. 7. However, the second female end 402 may also accommodate the first male end 114, as illustrated in FIG. 8. More specifically, the second female single frustum angle 512 may be substantially the same as the second male frustum angle 314 of the first male end 114. Accordingly, when the first male end 114 is positioned within the second female end 402, e.g., when the two components are matingly engaged, the single frustum-shaped section 502 of the second female end 402 may be substantially aligned (e.g., angularly aligned) with the second male frustum-shaped section 308. Further, the single frustum-shaped section 502 may extend past, e.g., longitudinally past, the male intermediate cylindrical portion 306 and a portion of the first male frustum-shaped section 304 until it reaches the first cylindrical opening 508.

In some aspects of this disclosure, an annular channel 802 is defined between first male end 114 and the second female end 402 when they are coupled to one another, as illustrated in FIG. 8. The annular channel 802 may be defined between the male intermediate cylindrical portion 306, the first male frustum-shaped section 304, the single frustum-shaped section 502, and the first female cylindrical opening 508. In other words, the second female end 402 may define a cavity along the second female transition section or profile 406 that is larger than that of the first female end 102 in order to accommodate both the first and second male ends 114, 414.

Further, because the second female end 402 utilizes the same sized second female cylindrical opening 510 as the first female end 102, the seal assembly 118, 418 from either the first or second male end 114, 414 will fluidly seal with the second female end 402. Accordingly, either male connector end 114, 414 can be fluidly coupled to the second female end 402. Similarly, the first cylindrical openings 208, 508 may be sized to allow either the first or second male end 114, 414 to be received therein. Accordingly, in some aspects of this disclosure the proximal and distal portions of the male ends 114, 414 and the female ends 102, 402 may be sized to correspond with one another. In this configuration, the first connector 100 and the second connector 400 may only substantially differ from one another along the transition profiles 106, 116, 406, 416.

While specific transition profiles 106, 116, 406, 416 are disclosed herein, other transition profiles are also considered along the corresponding transition profile sections 106, 116, 406, 416. More specifically, other embodiments may have any type of geometry along the transition profiles 106, 116, 406, 416 as long as the geometries of both the male and female portions allow the cylindrical openings, e.g. first cylindrical openings 210, 510, of the female end to be fluidly coupled to corresponding cylindrical portions, e.g. cylindrical portions 310, 610, of the male end. In other words, this disclosure considers implementing many different profiles along the transition profile section of the male and female ends as long as the two ends can be fluidly coupled to one another.

Figure 9:
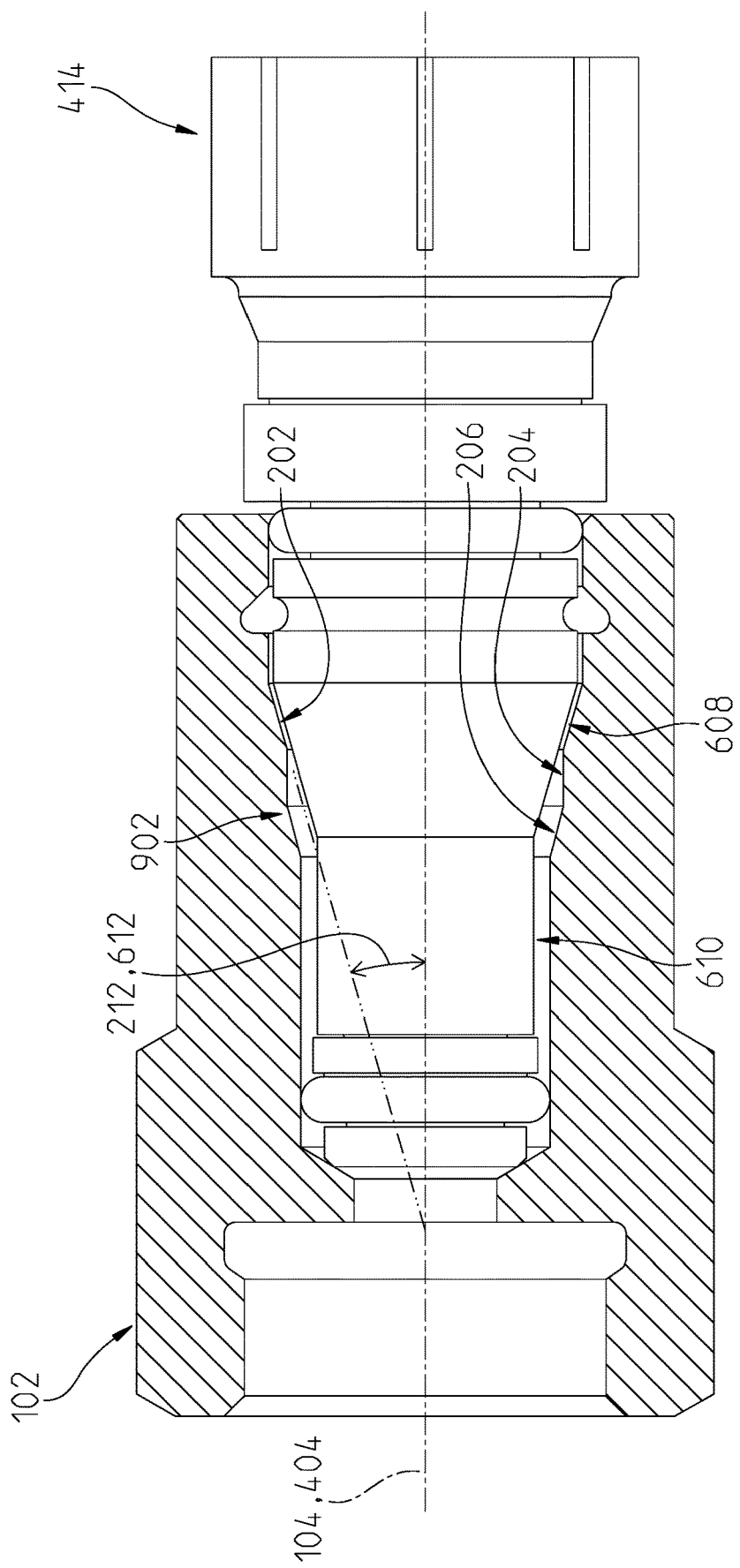
FIG. 9 is a sectional side view of a first female connector fluidly coupled to a second male connector.

In another aspect of this disclosure second male end 414 may be coupled to either the first female end 102 or the second female end 402. FIG. 7 illustrates the second male end 414 coupled to the second female end 402 as described herein. FIG. 9 however, illustrates the second male end 414 coupled to the first female end 102. More specifically, the first female frustum angle 212 may be substantially the same as the second male single frustum angle 612 of the second male end 414. Accordingly, when the second male end 414 is positioned within the first female end 102, e.g., when the two components are matingly engaged, the first female frustum-shaped section 202 of the first female end 102 may be substantially aligned with the second male frustum-shaped section 608. Further, the second male single frustum-shaped section 608 may extend past, e.g., axially past, at least a portion of one or more of the female intermediate cylindrical portion 204 and the second female frustum-shaped section 206 until it reaches the second male small cylindrical portion 610.

In some aspects of this disclosure, an annular channel 902 is defined between second male end 414 and the first female end 102 when they are coupled to one another as illustrated in FIG. 9. The annular channel 902 may be defined between the female intermediate cylindrical portion 204, the second female frustum-shaped section 206, the second male frustum-shaped section 608, and the second male small cylindrical portion 610, e.g., these male sections may be radially smaller than the nearby female sections. In other words, the second male end 414 may have less material around the second male transition section or profile 416 compared to the first male end 114 in order to accommodate both the first and second female ends 102, 402.

Figure 10:
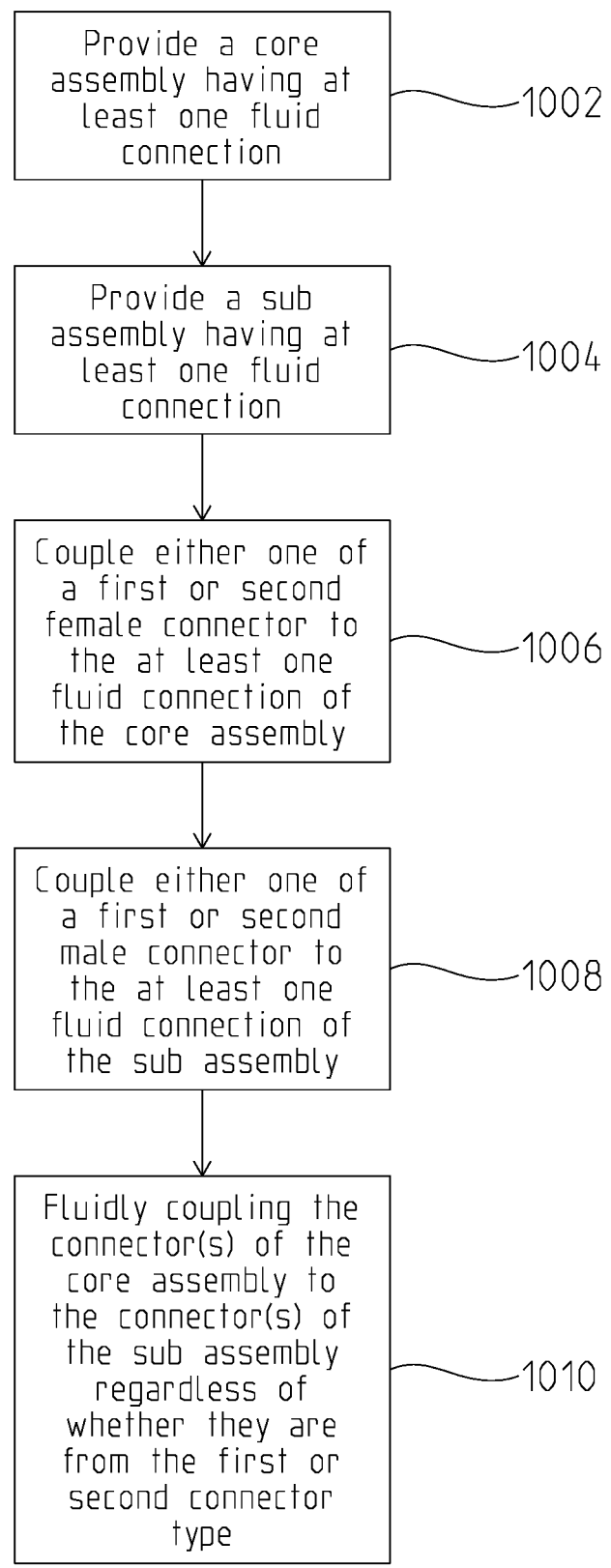
FIG. 10 is a process flowchart of one embodiment of a manufacturing process.

In one application of this disclosure, any one of the first or second male ends 114, 414 may be paired with either one of the first or second female ends 102, 402. More specifically, if a manufacturing or assembly line has a process where hoses are coupled to fluid systems, as illustrated in FIG. 10, any combination of the connectors 100, 400 described herein could be used. A diagram or the like could be provided on the assembly line indicating that hoses with either the first or second female ends 102, 402 may be fluidly coupled to hoses with either of the first or second male ends 114, 414. More specifically, in box 1002 a core assembly may have at least one fluid connection thereon. The core assembly may require fluid coupling to a sub assembly to function properly as described in box 1004. In box 1006, one or more of either of the first and/or second female ends 102, 402 can be coupled to the fluid connection of the core assembly. Further, in box 1008, one or more of either of the first and/or second male ends 114, 414 may be fluidly coupled to the fluid connection of the sub assembly. In box 1010, the one or more of the female end(s) 102, 402 of the core assembly may be coupled to the one or more male end(s) 114, 414 of the sub assembly, regardless of which type of the two connectors was used.

While the core assembly was referred to as coupled to the female ends 102, 402, this disclosure is not limited to such a configuration. Rather, the core assembly could be coupled to the male ends 114, 414 instead. Further still, the core assembly could be coupled to a plurality of connectors as well, with some of the connectors being male 114, 414 and some of the connectors being female 102, 402. Further still, a first male end 114 may be removed from a second female end 402 and a second male connector 414 may be fluidly coupled thereto or vice versa. Accordingly, any number and combinations of connectors 100, 400 described herein can be used to fluidly couple a core assembly to a sub assembly and this disclosure considers any combination mentioned herein.

Further, the connectors themselves 100, 400 could have labels thereon indicating that they are compatible with different types of fluid connectors. By allowing the hose fittings to be interchangeable, the assembly line may have more diverse options in obtaining the proper fittings and thereby reduce downtime and increase access to useable connectors.

Further still, the manufacturing or assembly process may include coupling at least one of a plurality of female hose adapters to a first male connector and at least one of the plurality of female hose adapters to a second male connector. That is to say, during manufacturing a core assembly, such as a work machine, may have a plurality of sub-assemblies that need fluidly coupled thereto. Each of the sub-assemblies may have one or more of the first and/or second male ends 114, 414 coupled to a fluid system. The core assembly may have one or more of the first and/or second female ends 102, 402 coupled to a fluid system of the core assembly. In this configuration, the sub-assemblies can be fluidly coupled to the core assembly via any combination of first or second male ends 114, 414 and first or second female ends 102, 402.

While exemplary embodiments incorporating the principles of the present disclosure have been described herein, the present disclosure is not limited to such embodiments. Instead, this application is intended to cover any variations, uses, or adaptations of the disclosure using its general principles. Further, this application is intended to cover such departures from the present disclosure as come within known or customary practice in the art to which this disclosure pertains.

The invention claimed is:
1. A connector, comprising:
a receiving end that receives a fluid device;
a female quick connect end coupled to the receiving end;
a through hole defined between the receiving end and the female quick connect end to allow fluid to flow therebetween;
wherein, the female quick connect end comprises:
a first cylindrical opening having a first diameter;

a second cylindrical opening having a second diameter, the second diameter being smaller than the first diameter;
a female transition section between the first cylindrical opening and the second cylindrical opening that provides a transition from the first diameter of the first cylindrical opening to the second diameter of the second cylindrical opening;
further wherein, the female transition section accommodates both a first male transition section and a second male transition section to fluidly couple the female quick connect end to either one of a first male end having the first male transition section and a second male end having the second male transition section, wherein:
the first male end, comprises:
  a first cylindrical portion;
  an intermediate cylindrical portion; and
  a second cylindrical portion; and
  wherein the first male transition section is between the first cylindrical portion and the second cylindrical portion, the intermediate cylindrical portion being positioned in the first male transition section;
the second male end, comprises:
  a first cylindrical portion; and
  a second cylindrical portion;
  wherein the second male transition section is between the first cylindrical portion and the second cylindrical portion and is not the same as the first male transition section
wherein, the female transition section has a profile that is different from both a profile of the first male transition section and a profile of the second male transition section.

2. The connector of claim 1, further wherein the female transition section has a frustum-shaped profile defined about a longitudinal axis.

3. The connector of claim 2, further wherein:
the first male transition section further comprises:
  a first frustum-shaped section defined between the first cylindrical portion and the intermediate cylindrical portion at a first frustum angle relative to the longitudinal axis; and
  a second frustum-shaped section defined between the intermediate cylindrical portion and the second cylindrical portion at a second frustum angle relative to the longitudinal axis;
  the frustum-shaped profile of the female transition section has a female frustum angle of about the same as the second frustum angle.

4. The connector fluid adapter assembly of claim 3, further wherein the second frustum angle is different from the first frustum angle.

5. The connector of claim 3, further wherein inner walls of a cross-section of the female transition section are substantially parallel to outer walls of the second frustum-shaped section of the first male transition section.

6. The connector of claim 3, further wherein walls of the female transition section are not parallel to walls of the first frustum-shaped section of the first male transition section.

7. The connector of claim 2, further wherein:
the second male transition section further comprises:
  a single frustum-shaped section defined between the first cylindrical portion and the second cylindrical portion at a single frustum angle relative to the longitudinal axis;
  wherein, the frustum-shaped section of the female transition section has a female frustum angle that is less than the single frustum angle of the second male transition section.

8. The connector of claim 7, further wherein the single frustum-shaped section of the second male transition section extends axially along the longitudinal axis between a male starting point and a male ending point and the frustum-shaped profile of the female transition extends axially along the longitudinal axis between a female starting point and a female ending point, wherein none of the male starting point, male ending point, female starting point, or female ending point are axially aligned along the longitudinal axis when the second male transition section is coupled to the female quick connect end.

9. The connector of claim 8, further wherein the male starting point is spaced axially away from the female starting point along the longitudinal axis by a gap.

10. A connector, comprising:
a female end comprising:
  a receiving end that receives a fluid device;
  a female quick connect end coupled to the receiving end;
  a through hole defined between the receiving end and the female quick connect end to allow fluid to flow therebetween;
  wherein, the female quick connect end comprises:
    a first cylindrical opening having a first diameter;
    a second cylindrical opening having a second diameter, the second diameter being smaller than the first diameter;
    a female transition profile defined between the first cylindrical opening and the second cylindrical opening, the female transition profile providing a transition from the first diameter of the first cylindrical opening to the second diameter of the second cylindrical opening; and
a male end comprising a male transition profile;
wherein, the female quick connect end is coupleable to the male end, the female transition profile being different from the male transition profile
wherein, the male end is one of a first male end having a first male transition profile or a second male end having a second male transition profile, the first male transition profile being different than the second male transition profile and the female transition profile is sized to at least partially receive either the first male end or the second male end.

11. The connector of claim 10, further wherein the female transition profile is frustum-shaped.

12. The connector of claim 11, further wherein the female transition profile is angled relative to a longitudinal axis at a female profile angle, the female profile angle being about the same as a leading male profile angle of the first male transition profile.

13. The connector of claim 11, further wherein the female transition profile is angled relative to a longitudinal axis at a female profile angle, the female profile angle being less than a male profile angle of the second male transition profile.

14. The connector of claim 10, further wherein, the female quick connect end fluidly couples the corresponding first or second male end to the through hole at the second cylindrical opening.

15. A method of manufacturing a machine having at least one fluid connector, comprising:

providing a female fluid adapter assembly having a female quick connect end, comprising:
a first cylindrical opening having a first diameter;
a locking member defined in a portion of the first cylindrical opening;
a second cylindrical opening having a second diameter, the second diameter being smaller than the first diameter;
a female transition section between the first cylindrical opening and the second cylindrical opening, the female transition section having a female transition profile between the first diameter of the first cylindrical opening to the second diameter of the second cylindrical opening;
providing at least one of a first male connector or a second male connector;
wherein the first male connector has a first male quick connect end comprising:
a first cylindrical portion;
an intermediate cylindrical portion;
a second cylindrical portion; and
a first male transition section between the first cylindrical portion and the second cylindrical portion, the intermediate cylindrical portion being positioned in the first male transition section;
wherein the second male connector has a second male quick connect end comprising:
a first cylindrical portion;
a second cylindrical portion; and
a second male transition section between the first cylindrical portion and the second cylindrical portion, wherein the second male transition section is not the same as the first male transition section;
selecting one of the first male connector or the second male connector and fluidly coupling the selected male quick connect end to the female quick connect end by inserting the selected male quick connect end into the female quick connect end until the locking member engages the selected male quick connect end;
wherein, the female transition section has a profile that is different from both a profile of the first male transition section and a profile of the second male transition section.

16. The method of manufacturing a machine having at least one connector of claim 15, further comprising removing the selected male quick connect end from the female quick connect end and inserting the other of the first male quick connect end or the second male quick connect end into the female quick connect end.

17. The method of manufacturing a machine having at least one connector of claim 15, further comprising providing a plurality of female fluid adapters and coupling at least one of the plurality of female fluid adapters to the first male connector and at least one of the plurality of female fluid adapters to the second male connector.

\* \* \* \* \*